United States Patent
Bhan et al.

(10) Patent No.: US 10,563,134 B2
(45) Date of Patent: *Feb. 18, 2020

(54) CATALYST AND ITS USE FOR THE SELECTIVE HYDRODESULFURIZATION OF AN OLEFIN CONTAINING HYDROCARBON FEEDSTOCK

(71) Applicant: SHELL OIL COMPANY, Houston, TX (US)

(72) Inventors: Opinder Kishan Bhan, Katy, TX (US); David Andrew Komar, Magnolia, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,678

(22) Filed: Jan. 23, 2019

(65) Prior Publication Data

US 2019/0151836 A1    May 23, 2019

Related U.S. Application Data

(62) Division of application No. 14/693,967, filed on Apr. 23, 2015, now Pat. No. 10,220,379.

(60) Provisional application No. 61/987,047, filed on May 1, 2014.

(51) Int. Cl.
| | |
|---|---|
| *C10G 45/08* | (2006.01) |
| *B01J 35/10* | (2006.01) |
| *B01J 23/882* | (2006.01) |
| *B01J 23/883* | (2006.01) |
| *B01J 27/19* | (2006.01) |
| *B01J 37/00* | (2006.01) |
| *C10G 45/38* | (2006.01) |
| *C10G 69/04* | (2006.01) |
| *B01J 27/199* | (2006.01) |

(52) U.S. Cl.
CPC ............ *C10G 45/08* (2013.01); *B01J 23/882* (2013.01); *B01J 23/883* (2013.01); *B01J 27/19* (2013.01); *B01J 27/199* (2013.01); *B01J 35/108* (2013.01); *B01J 35/109* (2013.01); *B01J 35/1019* (2013.01); *B01J 35/1042* (2013.01); *B01J 35/1061* (2013.01); *B01J 35/1066* (2013.01); *B01J 35/1076* (2013.01); *B01J 37/0036* (2013.01); *C10G 45/38* (2013.01); *C10G 69/04* (2013.01); *C10G 2300/1037* (2013.01); *C10G 2300/202* (2013.01); *C10G 2300/305* (2013.01); *C10G 2300/701* (2013.01); *C10G 2400/02* (2013.01)

(58) Field of Classification Search
CPC ............ C10G 45/02–08; B01J 35/1061; B01J 35/1066; B01J 35/109
See application file for complete search history.

(56) References Cited

U.S. PATENT DOCUMENTS

| | | | | |
|---|---|---|---|---|
| 5,545,602 A | * | 8/1996 | Nelson | B01J 23/85 502/210 |
| 2006/0213814 A1 | * | 9/2006 | Romero | C10G 45/08 208/243 |
| 2006/0237345 A1 | * | 10/2006 | Bhan | B01J 23/883 208/216 R |
| 2012/0168347 A1 | * | 7/2012 | Eijsbouts-Spickova | B01J 23/88 208/46 |

* cited by examiner

*Primary Examiner* — Renee Robinson
(74) *Attorney, Agent, or Firm* — Charles W. Stewart

(57) ABSTRACT

A catalyst and its use for selectively desulfurizing sulfur compounds present in an olefin-containing hydrocarbon feedstock to very low levels with minimal hydrogenation of olefins. The catalyst comprises an inorganic oxide substrate containing a nickel compound, a molybdenum compound and optionally a phosphorus compound, that is overlaid with a molybdenum compound and a cobalt compound. The catalyst is further characterized as having a bimodal pore size distribution with a large portion of its total pore volume contained in pores having a diameter less than 250 angstroms and in pores having a diameter greater than 1000 angstroms.

9 Claims, No Drawings

CATALYST AND ITS USE FOR THE SELECTIVE HYDRODESULFURIZATION OF AN OLEFIN CONTAINING HYDROCARBON FEEDSTOCK

CROSS-REFERENCE TO RELATED APPLICATION

This application is a divisional of U.S. Non-Provisional application Ser. No. 14/693,967, filed on Apr. 23, 2015 entitled A CATALYST AND ITS USE FOR THE SELECTIVE HYDRODESULFURIZATION OF AN OLEFIN CONTAINTING HYDROCARBON FEEDSTOCK, which claims priority from the U.S. Provisional Application No. 61/987,047, filed on May 1, 2014, the entirety of which is incorporated by reference herein.

FIELD OF THE INVENTION

This invention relates to a catalyst and process for the selective hydrodesulfurization of an olefin-containing hydrocarbon feedstock.

BACKGROUND

Gasoline regulations are increasingly creating a need to treat various refinery streams and products, for example, cracked gasoline blending material, including coker naphtha and gasoline from a catalytic cracking unit, to remove undesirable sulfur that is contained in such refinery streams and products.

One means by which sulfur may be removed from hydrocarbon streams that contain olefin compounds is through the use of various known catalytic hydroprocessing methods. A problem with the use of many conventional catalytic hydroprocessing methods is that they typically tend to hydrogenate the olefin compounds as well as the sulfur compounds contained in the hydrocarbon feed stream being treated. When the hydrocarbon feed stream is to be used as a gasoline-blending component, usually the presence of the olefins is desirable due to their relatively high-octane values and octane contribution to the gasoline pool.

Cracked gasoline blending material typically contains high concentrations of high-octane olefin compounds as well as concentrations of sulfur compounds. It is desirable to be able to catalytically desulfurize the cracked gasoline blending materials with a minimum of hydrogenation of the olefins contained in them. Disclosed in the prior art are many types of hydroprocessing catalysts and processes, and the prior art even discloses processes for the selective hydrodesulfurization of olefin containing hydrocarbon feedstocks.

U.S. Pat. No. 5,266,188 is one patent that discloses a process for the selective hydrotreating of a cracked naphtha using a catalyst comprising a Group VIB metal component, a Group VIII metal component, a magnesium component, and an alkali metal component. The Group VIB metal component is present in the catalyst in an amount in the range of from about 4 wt % to about 20 wt %, and the Group VIII metal component is present in the range of from about 0.5 wt % to about 10 wt %, both calculated as oxides and based on the total catalyst weight. The preferred Group VIB metals are molybdenum and tungsten with molybdenum being preferred among these, and the preferred Group VIII metals are cobalt and nickel with cobalt being preferred among these.

U.S. Pat. No. 5,686,375 discloses a hydroprocessing catalyst that contains an overlayer of a Group VIB metal (preferably molybdenum) component on a support comprising an underbedded Group VIII metal (preferably nickel) component combined with a porous refractory oxide. The catalyst typically contains greater than 3.0, preferably greater than 4.0, and most preferably greater than 4.5 weight percent of Group VIII metal component (calculated as the monoxide) and greater than 10, and preferably greater than 17 weight percent of Group VIB metal component (calculated as the trioxide). A preferred catalyst is essentially free of supported metal components other than molybdenum and underbedded nickel. A most highly preferred embodiment of the catalyst contains above 3 weight percent of nickel components, including underbedded nickel components encompassing at least 4.5 weight percent of the support. The catalyst is used in hydroprocessing methods such as desulfurization and denitrogenation, but there is no indication that the process is selective to desulfurization.

U.S. Patent Publication No. 2003/0183556 A1 discloses a process for the selective hydrodesulfurization of naphtha which uses a preferred catalyst that comprises a $MoO3$ concentration of about 1 to 10 wt. %, preferably about 2 to 8 wt. %, and more preferably about 4 to 6 wt. %, based on the total weight of the catalyst, and a CoO concentration of about 0.1 to 5 wt. %, preferably about 0.5 to 4 wt. %, and more preferably about 1 to 3 wt. % based on the total weight of the catalyst. The process includes blending a cracked naphtha feedstream that contains sulfur with a substantially olefin free naphtha feedstream and selectively hydrodesulfurizing the blend in the presence of a hydrodesulfurizing catalyst.

U.S. Pat. Nos. 6,589,418; 6,126,814; and 6,013,598 discloses processes for the selective hydrodesulfurization of an olefin-containing naphtha feedstock that use catalysts that are similar to those disclosed in U.S. Patent Publication No. 2003/0183556.

U.S. Pat. No. 5,286,373 discloses a process for selectively hydrodesulfurizing a naphtha feedstock having a high olefin content by using a deactivated hydrotreating catalyst.

The deactivated hydrotreating catalyst is a hydrotreating catalyst that has been deactivated by use or by other means, and it generally contains deposits of coke. The hydrotreating catalyst typically includes Group VI and Group VIII metals, provided on a porous support. The preferred Group VI metals include chromium, molybdenum and tungsten, and the preferred Group VIII metals include cobalt and nickel. Additional metals or other elements can be present, such as phosphorus, fluorine, titanium, boron and the like. The particularly preferred metals include cobalt and molybdenum.

As may be seen from the above review of some of the prior art there is great interest in the development of processes that provide for the selective catalytic hydrodesulfurization of sulfur-containing naphtha or hydrocarbon feedstocks that boil in the gasoline boiling range and contain high olefin contents. By the selective hydrodesulfurization of the sulfur without significant simultaneous hydrogenation of the olefins the loss in octane of the feedstock may be minimized; since, as noted above, olefins tend to be high-octane components of certain gasoline blending components.

An objective of the present invention therefore is to provide a catalyst and process for selectively desulfurizing a sulfur-containing hydrocarbon feedstock that has high olefin content.

BRIEF SUMMARY OF THE INVENTION

Thus, in accordance with the invention, provided is a selective hydrodesulfurization catalyst comprising: a calcined catalyst particle made by calcining a shaped particle of a mixture comprising an inorganic oxide support material, molybdenum trioxide, and a nickel compound to provide a calcined shaped mixture; wherein the calcined shaped mixture is further overlaid with a cobalt compound and a molybdenum compound and is subjected to a further calcination step to produce the calcined catalyst particle; the calcined catalyst particle being characterized by having a bimodal pore size distribution with at least 20% of the total pore volume being in pores having a diameter less than 250 angstroms and at least 10% of the total pore volume being in pores having a diameter greater than 1000 angstroms. Generally, the total pore volume of the inventive catalyst will be greater than 0.4 cc/gram.

Preferably, the calcined catalyst particle in accordance with the invention will have at least 30% of its total pore volume in pores having a diameter less than 250 angstroms and at least 15% of its total pore volume in pores having a diameter greater than 1000 angstroms. Preferably, the total pore volume of the inventive catalyst will be greater than 0.5 cc/gram.

Even more preferably, the calcined catalyst particle in accordance with the invention will have at least 40% of its total pore volume in pores having a diameter less 250 angstroms and at least 20% of its total pore volume in pores having a diameter greater than 1000 angstroms.

It is also preferred for the nickel component in the calcined catalyst particle to be incorporated into its catalyst as part of the calcined mixture and for there to be a material absence of impregnated nickel in the overlayer.

The present invention further provides a process for selectively hydrodesulfurizing sulfur compounds contained in an olefin-containing hydrocarbon feedstock with minimal hydrogenation of olefins, which process comprises: contacting under selective hydrodesulfurization conditions an olefin-containing hydrocarbon feedstock with a catalyst comprising: a calcined catalyst particle made by calcining a shaped particle of a mixture comprising an inorganic oxide support material, molybdenum trioxide, and a nickel compound to provide a calcined shaped mixture; wherein the calcined shaped mixture is further overlaid with a cobalt compound and a molybdenum compound and is subjected to a further calcination step to produce the calcined catalyst particle; the calcined catalyst particle being characterized by having a bimodal pore size distribution with at least 20% of its total pore volume being in pores having a diameter less than 250 angstroms and at least 10% of its total pore volume being in pores having a diameter greater than 1000 angstroms.

Preferably, the calcined catalyst particle employed in the process of the invention will have at least 30% of its total pore volume in pores having a diameter less than 250 angstroms, at least 15% of its total pore volume in pores having a diameter greater than 1000 angstroms. Preferably, the total pore volume of the catalyst employed in the inventive process is greater than 0.5 cc/gram.

Even more preferably, the calcined catalyst particle employed in the process of the invention will have at least 40% of its total pore volume in pores having a diameter less than 250 angstroms, at least 20% of its total pore volume will be in pores having a diameter greater than 1000 angstroms.

DETAILED DESCRIPTION OF THE INVENTION

The invention is directed to a catalyst and process for the selective hydrodesulfurization of an olefin-containing hydrocarbon feedstock that has a sulfur concentration. What is meant when referring herein to the selective hydrodesulfurization of a feedstock is that sulfur is removed from the feedstock by the catalytic hydrogenation of the sulfur compounds, but with minimum simultaneous hydrogenation of the olefin compounds contained in the feedstock. Refinery cracked feedstocks, such as cracked naphtha or gasoline, typically contain high concentrations of olefins as well as sulfur compounds, and it is desirable to be able to selectively desulfurize such cracked feedstocks with a minimum of olefin saturation.

The catalyst and process of the present invention are particularly suitable for selectively desulfurizing hydrocarbon feedstocks that boil in the naphtha or gasoline boiling range, which is typically from about 10° C. (50° F.) to about 232.2° F. (450° F.), and, preferably from about 21° C. (70° F.) to about 221° C. (430° F.). More preferably, the hydrocarbon feedstock predominantly boils in the range of from 32° C. (90° F.) to 210° C. (410° F.).

Hydrocarbon feedstocks that may be selectively desulfurized in accordance with the present invention will contain both olefin compounds and sulfur compounds. The olefin content or concentration of the hydrocarbon feedstock treated in accordance with the present invention can be in the range of upwardly to about 60 weight percent (wt %) of the total weight of the hydrocarbon feedstock and usually at least 5 wt % of the total weight of the hydrocarbon feedstock. A typical olefin content of the hydrocarbon feedstock is in the range of from 5 wt % to 55 wt % of the total weight of the hydrocarbon feedstock, and, more typically, the range is from 8 wt % to 50 wt %. It is contemplated, however, that the hydrocarbon feedstock treated in accordance with the present invention will have concentrations of olefin compounds exceeding 10 wt % and even exceeding 15 wt % or even 20 wt %.

Generally, the hydrocarbon feedstock is olefin-containing and can be a cracked naphtha product such as products from catalytic or thermal cracking units including, for example, an FCC cracked naphtha product from a conventional fluid catalytic cracking unit, a coker naphtha from either a delayed coker unit or a fluid coker unit, a hydrocracker naphtha and any combination of cracked naphtha products. The cracked naphtha product typically has a high concentration of olefin compounds and may have an undesirably high concentration of sulfur compounds.

The olefin-containing hydrocarbon feedstock of the inventive process can have a significant sulfur content or sulfur concentration that generally is in the range of from about 0.005 weight percent, i.e., 50 parts per million by weight (ppmw), to about 1 weight percent, i.e., 10,000 ppmw. More typically, the sulfur content is in the range of from 100 ppmw to 5000 ppmw, and, most typically, from 300 ppmw to 4000 ppmw. The sulfur compounds of the olefin-containing hydrocarbon feedstock include organic sulfur compounds, such as, for example, disulfide compounds, thiol compounds, thiophene compounds and benzothiophene compounds.

The olefin-containing hydrocarbon feedstock may also contain other hydrocarbon compounds besides paraffin compounds and olefin compounds. The olefin-containing hydrocarbon feedstock may further comprise naphthenes, and, further, comprise aromatics, and, further, comprise other unsaturated compounds, such as, open-chain and cyclic olefins, dienes, and cyclic hydrocarbons with olefinic side chains.

In one embodiment of the invention, an olefin-containing hydrocarbon feedstock containing from about 2000 ppmw to 3000 ppmw of sulfur compounds is hydrodesulfurized in a hydrotreating reactor down to a sulfur concentration of from 100 ppmw to 300 ppmw. Thereafter, the sulfur concentration of the olefin-containing hydrocarbon feedstock is further reduced in another hydrotreating reactor, i.e., a "polishing" or "finishing" reactor", down to a concentration of from 20 ppmw to 60 ppmw sulfur, preferably down to a concentration of less than 15 ppmw sulfur, and more preferably down to a concentration of 10 ppmw or less sulfur.

The inventive catalyst and process provides for the selective removal of sulfur from an olefin-containing hydrocarbon feedstock, having a sulfur concentration, by catalytic hydrodesulfurization. It is understood herein that the references to hydrodesulfurization means that the sulfur compounds of a feedstock are converted by the catalytic hydrogenation of the sulfur compounds to hydrogen sulfide which may then be removed to provide a low sulfur product. It has been discovered that the use of a specifically defined catalyst composition in the hydrodesulfurization of the olefin-containing hydrocarbon feedstock will provide for improvements in the selective hydrodesulfurization of the olefin-containing hydrocarbon feedstocks as compared to the use of conventional hydrodesulfurization catalysts.

A very important aspect of the selective hydrodesulfurization catalyst of the present invention is its unique composition, especially with regard to the placement of the catalytically active metals in and on the shaped catalyst particle, and the unique bimodal pore structure of the catalyst with a large percentage of pores having a diameter less than 250 angstroms and a large percentage of pores with diameters over 1000 angstroms, and in some embodiments even over 5000 angstroms.

The inventive selective hydrodesulfurization catalyst generally comprises a calcined mixture made by calcining a formed (shaped) particle of a mixture comprising an inorganic oxide support material, molybdenum trioxide and a nickel compound. The calcined shaped mixture or particle is then overlaid (preferably by impregnation) with a cobalt compound and a further amount of a molybdenum compound and then subjected to a second calcination step.

It is preferred for the nickel component of the inventive catalyst be incorporated into the shaped catalyst particle as underbedded nickel, and that there be a material absence of impregnated nickel on the surface of the catalyst. It has been determined that the presence of a material amount of impregnated nickel on the surface of the catalyst has the effect of reducing its selectivity toward the desulfurization of an olefin-containing hydrocarbon feedstock; and, thus, it provides for an undesirable amount of olefin saturation. By "material absence of impregnated nickel on the surface of the catalyst" is meant that there is less than 1.0 wt %, preferably less than 0.5 wt %, and most preferably less than 0.2 wt %, of impregnated nickel on the surface of the catalyst, calculated as the nickel being in the elemental form even though the nickel may be in another form.

While it is desirable to hold the amount of impregnated nickel on the surface to levels below 1.0 wt %, it is understood that the inventive catalyst may have a small concentration of non-impregnated nickel, e.g., less than 0.1 wt %, preferably less than 0.5 wt % on the surface of the catalyst as a result forming the shaped particle from a mixture comprising an inorganic oxide support material, molybdenum trioxide and a nickel compound. However, the majority of the non-impregnated nickel will be underbedded, i.e., uniformly dispersed in the inorganic oxide support material, while only a minor amount of the underbedded nickel will be on the surface of the catalyst.

Another important feature of the inventive catalyst is its unique bimodal pore structure including a relatively large percentage of the total pore volume in large pores having pore diameters exceeding 1000 angstroms. In the inventive catalyst, at least 10%, preferably at least 15%, and more preferably 20% of the total pore volume will be pores having diameters exceeding 1000 angstroms.

In one embodiment of the invention the unique bimodal pore structure will, in addition to having a large percentage of the total pore volume in its pores with diameters exceeding 1000 angstroms, also contain a relatively large percentage of very large pores exceeding 5000 angstroms. In this embodiment at least 5%, preferably at least 10%, and more preferably at least 15%, of the total pore volume will be in pores having a diameter greater than 5000 angstroms.

Without wishing to be bound to any particular theory, it is believed that bimodal pore structure and presence of a relatively high percentage of large diameter pores contributes to the outstanding selective desulfurization properties of the inventive catalyst; because, the presence of the high amount of large pores results in shifting the available surface area so as to reduce the surface area within one range of pore diameters and increasing it in another. The presence of the high amount of large pores also reduces the diffusional resistance that sulfur-containing aromatic species may have to being transported into the catalyst interior. The presence of molybdenum and nickel in the calcined shaped mixture, and molybdenum and cobalt in the overlayer, allow for removal of sulfur by direct desulfurization, thus reducing overall hydrogenation and protecting a majority of olefin compounds from hydrogenation.

References herein to total pore volume or pore size distribution are to the pore volume or pore size distribution as determined using the Standard Test Method for Determining Pore Volume Distribution of Catalysts by Mercury Intrusion Porosimetry, ASTM D4284-88, at a maximum pressure of 4000 bar, and a contact angle of 140°.

The porous refractory oxide of the catalyst composition can be any refractory oxide material that has the properties suitable for use as the support component of the catalyst composition including the unique bimodal pore structure. Examples of possible suitable porous refractory oxide materials include silica, magnesia, silica-titania, zirconia, silica-zirconia, titania, silica-titania, alumina, silica-alumina, and alumino-silicate. The preferred porous refractory oxide is alumina. The alumina can be in amorphous form or various crystalline forms, such as, alpha alumina, beta alumina, gamma alumina, delta alumina, eta alumina, theta alumina, boehmite, or mixtures thereof. Among the available forms of alumina, gamma alumina is most preferred.

As discussed above, an important feature of the inventive catalyst is its bimodal pore size distribution with a large percentage of pores with diameters less than 250 angstroms, and large percentage of pores with diameters greater than 1000 angstroms. The total pore volume of the inventive catalyst, as measured by standard mercury porosimetry methods, is in the range of from 0.4 cc/gram to 1.0 cc/gram. Preferably, the total pore volume is in the range of from 0.5 cc/gram to 0.9 cc/gram, and, most preferably, from 0.6 cc/gram to 0.8 cc/gram. The surface area of the inventive catalyst, as measured by the B.E.T. method, generally exceeds about 125 $m^2$/gram, and it is typically in the range of from about 150 to about 250 $m^2$/gram.

Another important aspect of the inventive catalyst, is that the nickel content should be substantially or completely in the form of underbedded nickel. Thus, the catalyst contains no material concentration of impregnated nickel in the overlayer, i.e., there is a material absence of impregnated nickel in the overlayer. Thus, the step of impregnating the calcined shaped particle does not include the incorporation of any significant or material amount of nickel in the impregnating solution.

In one embodiment of the inventive catalyst there is no material concentration of cobalt incorporated into the support. In other words there is no underbedded cobalt. Rather the cobalt component of the catalyst is present in the form of a cobalt overlayer on the refractory porous oxide support containing the underbedded molybdenum and nickel components, and optionally a phosphorus component.

In yet another embodiment of the inventive catalyst, the molybdenum content of the catalyst is in the form of both underbedded molybdenum and an overlayer containing molybdenum.

It is also a feature of the inventive catalyst to further comprise a phosphorus component. This phosphorus component can be in the form either as underbedded phosphorus or as an overlayer of phosphorus. In a preferred embodiment, the inventive catalyst contains phosphorus both in the form of underbedded phosphorus and as an overlayer of phosphorus.

While the mechanism explaining why the inventive catalyst exhibits particularly good catalytic properties is not certain, it is believed, however, that the particular combination of features of the catalyst, some of which features are noted above, is what contributes to its unique and unexpected selective hydrodesulfurization properties.

In the method for preparing the inventive catalyst two calcination steps are used. The particle subjected to the first calcination step is prepared by combining the starting materials of the catalyst to form a mixture. These starting materials include an inorganic oxide material, a molybdenum source, preferably molybdenum trioxide, and a nickel source. The inorganic oxide material, molybdenum source and nickel source for the mixture may be provided in whole or in part from crushed hydrotreating or hydrocracking catalyst fines.

In certain embodiments of the invention a phosphorus source may also be included in the preparation of the mixture. The phosphorus source for the mixture may also be provided in whole or part from crushed catalyst fines.

If crushed catalyst fines are employed as the source of the inorganic oxide material, molybdenum, nickel and/or phosphorus, it is preferred for the catalyst be crushed to yield a pore size distribution such that the median pore size diameter of the catalyst fines is under 100 μm, and preferably, under 50 μm.

It is believed that the form of the molybdenum source employed in the mixture contributes in some manner to the enhanced properties of the inventive catalyst. Therefore, it is preferred for the molybdenum source that is mixed with the other starting materials of the mixture to be in the form of molybdenum trioxide as opposed to, for example, a molybdenum salt compound. It is further desirable for the molybdenum trioxide to be in the form of finely divided particles, that may be as a dry powder, or as particles in a suspension or slurry, or particles obtained from crushed hydrotreating or hydrocracking catalyst fines.

The inorganic oxide material is also generally in the form of a powder and is selected from the group consisting of alumina, silica, and alumina-silica.

The nickel source may be selected from any suitable source of nickel including nickel salt compounds, e.g., nickel nitrate, both dry and dissolved in solution, nickel oxide, or any other suitable nickel source, including, for example from crushed catalyst fines.

The mixture is formed by any suitable method or means known to those skilled in the art, including, but not limited to, the use of such various solids-mixing machines as tumblers, stationary shells or troughs, muller mixers, which are either batch type of continuous type, and impact mixers, and the use of such suitable types of either batch-wise or continuous mixers for mixing solids or liquids or for the formation of paste-like mixtures that are extrudable. Suitable types of batch mixtures include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of starting materials of the catalyst may be conducted during any suitable time period necessary to properly homogenize the mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles (also referred to as "shaped" particles), such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

Once the starting materials of the catalyst are properly mixed, preferably by co-mulling, and formed into shaped particles, a drying step may advantageously be used for removing certain quantities of water or volatiles that are included within the mixture or shaped particles.

The drying of the shaped particles may be conducted at any suitable temperature for removing excess water or volatiles, but, preferably, the drying temperature will be in the range of from about 75° C. to 250° C.

The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 1000° F. (538° C.) to 1600° F. (871° C.), preferably between 1200° F. (649° C.) and 1500° F. (816° C.), and most preferably between 1250° F. (677° C.) and 1450° F. (788° C.).

Controlling the temperature conditions at which the mixture is calcined can be important to providing a calcined shaped particle having the pore structure properties described herein.

The amount of molybdenum that is co-mulled into the mixture should be such as to provide in the calcined shaped particle a molybdenum content in the range of from 1 weight percent (wt %) to about 9 wt % of the total weight of the calcined shaped particle, with the weight percent being based on the molybdenum as elemental metal. The calcined shaped particle is the co-mulled mixture that has been agglomerated or formed into a particle, e.g., extruded to form an extrudate, and that is calcined to provide a calcined shaped particle as described above.

It is desirable for the calcined shaped particle to have from 2 wt % to 7 wt % molybdenum; but, it is more desirable for the molybdenum content to be from 3 wt % to 6 wt % of the calcined shaped particle, on an elemental basis. It is understood that a significant, if not major, portion of the total molybdenum content of the final calcined catalyst particle is present as an overlayer of molybdenum in addition to the underbedded molybdenum.

The amount of nickel that is in the co-mulled mixture should be such as to provide in the calcined shaped particle a nickel content in the range of from or about 0.5 wt % to or about 2 wt % of the total weight of the calcined shaped particle, with the weight percent being based on the nickel as elemental metal. However, it is desirable for the nickel content of the calcined shaped particle to be in the range of from 0.3 wt % to 1 wt %, and, it is more desirable for the nickel content to be in the range of from 0.6 wt % to 0.9 wt % of the calcined shaped particle. It is preferred that substantially all of the nickel content of the inventive catalyst be in the form of underbedded nickel, and that there be no material amount, or the substantial absence, of overlaid nickel.

For the embodiments of the inventive catalyst which have a concentration of phosphorus, the phosphorus may be present in the form of underbedded phosphorus or as an overlayer of phosphorus, or as a combination of both underbedded phosphorus and phosphorus in the overlayer. The phosphorus may be present in the calcined catalyst particle (the finished catalyst) in an amount in the range of from 0.1 wt % to 3.5 wt %, calculated as the element. It is preferred for the phosphorus content of the calcined catalyst particle to be in the range of from 0.3 wt % to 2.5 wt %, and, most preferably, from 0.4 wt % to 1 wt %, calculated as the element.

The impregnation solution used to incorporate the overlayer of cobalt, molybdenum, and phosphorus, if present, into the calcined shaped particle so as to provide the impregnated particle is prepared by mixing together and dissolving a cobalt source, a molybdenum source, and a phosphorus source in water. Slight heating of the mixture may be applied as required to help in dissolving the components, and, if necessary, a suitable acid or base may be used to assist in the dissolution of the components. The pH of the impregnating solution is not critical. If phosphoric acid is used as the source of phosphorus, the pH may be relatively low, e.g., less than 4. If a base is added to the impregnating solution the pH may relatively high, e.g., above 8. In one embodiment of the invention, the impregnation solution is a base solution comprising a molybdenum source, a cobalt source and ammonium hydroxide, the latter of which can be formed by adding ammonia to the aqueous impregnating solution.

Molybdenum compounds that may suitably be used in the preparation of the impregnation solution include, but are not limited to, molybdenum trioxide and ammonium molybdate. If molybdenum trioxide is employed in the impregnating solution, it will typically be added with phosphoric acid and heated. If ammonium molybdate is employed in the impregnating solution, it typically will be added to a basic solution, e.g., aqueous ammonium hydroxide.

The molybdenum concentration in the impregnation solution that is incorporated into the calcined particle should be such as to provide for the final calcined catalyst particle having a molybdenum content in the range of from 9 wt % to 23 wt % (calculated as elemental metal), with the weight percent being based on the total weight of the calcined catalyst particle. Preferably, the amount of molybdenum that is contained in the impregnation solution to be such as to provide a calcined catalyst particle having a molybdenum content in the range of from 12 wt % to 19 wt %, more preferably from 14 wt % to 18 wt %. It has been surprisingly found that higher molybdenum concentrations in the calcined catalyst particle, e.g., from 14 wt % to 18 wt %, calculated as elemental metal, actually helps to reduce olefin saturation instead of increasing it as would be expected.

Cobalt compounds suitable for use in the preparation of the impregnation solution include, but are not limited to, cobalt hydroxide, cobalt nitrate, cobalt acetate, cobalt carbonate and cobalt oxide. Cobalt oxide and cobalt nitrate are the preferred cobalt compounds with cobalt oxide being the most preferred.

The amount of cobalt contained in the impregnation solution should be such as to provide for a final calcined catalyst particle having a cobalt content in the range of from 2 wt % to 8 wt %, calculated as elemental cobalt, with the weight percent being based on the total weight of the calcined catalyst particle. However, it is desirable for the amount of the cobalt compound that is contained in the impregnation solution to be such as to provide for the calcined catalyst particle having cobalt content in the range of from 3 wt % to 7 wt %, preferably, from 3 wt % to 6 wt % and, most preferably, from 3 wt % to 5 wt %, calculated as elemental cobalt.

When a phosphorus compound is used in the impregnation solution, it is typically added as a salt compound of phosphorus or an oxyacid of phosphorus. Suitable salt compounds include, but are not limited, to phosphate compounds with a cation such as sodium, potassium, rubidium, cesium, or ammonium, or any of the aqueous forms of phosphate (e.g., phosphate ion ($PO_4^{-3}$), hydrogen phosphate ion ($HPO_4^{-2}$), dihydrogen phosphate ion ($H_2PO^{-4}$) and trihydrogen phosphate ($H_3PO_4$)). Suitable oxyacids of phosphorus include but are not limited to phosphorus acid ($H_3PO_3$), phosphoric acid ($H_3PO_4$), hydrophosphorus acid ($H_3PO_2$).

The overlayer metals are preferably incorporated into the calcined shaped particle by any impregnation procedure or method that suitably provides for the metal overlayer of cobalt and molybdenum and, if applied, phosphorus, at the concentrations as presented above and to provide the impregnated particle. Suitable impregnation procedures include, for example, spray impregnation, soaking, multi-dip procedures, and incipient wetness impregnation methods.

The impregnated particle is then dried to remove a portion of the free water or other volatiles from the impregnated particle. The drying temperature is typically in the range of from 75° C. to 250° C. The time period for drying the impregnated particle is any suitable period of time necessary to provide for the desired amount of reduction in the volatile content of the particles prior to calcination of the impregnated particle.

The impregnated particle, which may or may not have been dried, is calcined in the presence of an oxygen-containing fluid, such as air. The temperature at which the impregnated particle is calcined generally is in the range of from 371° C. (700° F.) to about 648° C. (1200° F.). Preferably, the calcination temperature is in the range of from 427° C. (800° F.) to about 648° C. (1200° F.), and, more preferably, it is in the range of from 482° C. (900° F.) to 648° C. (1200° F.).

It has been found that the activity of the final catalyst is adversely affected if the impregnated shaped particle is calcined at high calcination temperature, for example at temperatures of 700° C. (1300° F.) or above. Therefore, it is preferred for the calcination temperature for the impregnated particle not exceed 648° C. (1200° F.).

The length of time for conducting the calcination is that which is required to remove the volatile matter and convert the metal compounds in the impregnated particle substantially into the metal oxide form. The time required for the calcination is generally in the range of from about 0.5 hours to about 4 hours.

The inventive selective hydrodesulfurization process includes contacting, under selective hydrodesulfurization conditions, an olefin-containing hydrocarbon feedstock as described herein with a catalyst composition as described herein, and, preferably, yielding a low sulfur product that has a sulfur concentration much reduced below the sulfur concentration of the olefin-containing hydrocarbon feedstock.

The inventive process can provide for a sulfur reduction in an amount greater than 40 weight percent of the sulfur contained in the olefin-containing hydrocarbon feedstock while causing less than a 30 percent bromine number reduction by the catalytic hydrogenation of the olefin compounds contained in the olefin-containing hydrocarbon feedstock to yield the low sulfur product. The bromine number of an olefin-containing hydrocarbon feedstock can the determined by ASTM D-1159 and is a measure of double bonds, i.e., unsaturation, in the hydrocarbon feedstock.

While the sulfur reduction of at least 40 weight percent with less than a 30 percent bromine number reduction is a reasonably selective hydrodesulfurization of an olefin-containing feedstock, it is desirable for the process to be more selective in the hydodesulfurization of the feedstock by providing for a higher percentage of sulfur reduction but with a 30 percent or lower bromine number reduction. It is, thus, desirable for the desulfurization to provide for a sulfur reduction of at least 50 weight percent and even at least 60 weight percent. Preferably, the sulfur reduction is at least 70 weight percent, and, more preferably, the sulfur reduction is at least 80 weight percent. Most preferably, the sulfur reduction is greater than 90 weight percent.

It is desirable for the bromine number reduction, which is a measure of the olefin reduction, be minimized Thus, it is desirable that the percent bromine number reduction upon hydrogenation be less than 30 weight percent. Preferably, the bromine number reduction is less than 25 weight percent, and, most preferably, the bromine number reduction is less than 20 weight percent.

When referring herein to the "weight percent sulfur reduction" of the sulfur contained in the olefin-containing hydrocarbon feedstock, what is meant is the difference between the weight percent of sulfur in the feedstock and the weight percent of sulfur in the yielded product, divided by the weight of sulfur in the feedstock, multiplied by the number one-hundred (100).

When referring herein to "bromine number reduction" what is meant is the difference between the bromine number of the olefin-containing hydrocarbon feedstock and the bromine number of the yielded product, divided by the bromine number of the olefin-containing hydrocarbon feedstock, multiplied by the number one-hundred (100).

The selective hydrodesulfurization catalyst of the invention may be employed as a part of any suitable reactor system that provides for the contacting of the catalyst composition with the hydrocarbon feedstock under suitable selective hydrodesulfurization reaction conditions that can include the presence of hydrogen and an elevated temperature and total pressure. Such suitable reactor systems can include fixed catalyst bed systems, ebullating catalyst bed systems, slurried catalyst systems, and fluidized catalyst bed systems. The preferred reactor system is that which includes a fixed bed of the catalyst composition contained within a reactor vessel equipped with a reactor feed inlet means, such as a feed inlet nozzle, for introducing the hydrocarbon feedstock into the reactor vessel, and a reactor effluent outlet means, such as an effluent outlet nozzle, for withdrawing the reactor effluent or low sulfur product from the reactor vessel.

The selective hydrodesulfurization reaction temperature is generally in the range of from about 232° C. (450° F.) to 343° C. (650° F.). The preferred selective hydrodesulfurization reaction temperature is in the range of from 249° C. (480° F.) to 316° C. (600° F.).

The inventive process generally operates at a selective hydrodesulfurization reaction pressure in the range of from about 100 psia to about 800 psia, preferably, from 150 psia to 600 psia, and, most preferably, from 200 psia to 400 psia.

The flow rate at which the olefin-containing hydrocarbon feedstock is charged to the reaction zone of the inventive process is generally such as to provide a liquid hourly space velocity (LHSV) in the range of from 0.1 $hr^{-1}$ to 15 $hr^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 1 $hr^{-1}$ to 12 $hr^{-1}$, more preferably, from 2 $hr^{-1}$ to 10 $hr^{-1}$.

The hydrogen treat gas rate is the amount of hydrogen charged to reaction zone of the present process together with the olefin-containing hydrocarbon feedstock. The amount of hydrogen relative to the amount of hydrocarbon feedstock charged to the reaction zone may be in the range upwardly to about 1000 $m^3/m^3$ (cubic meter/cubic meter) which is equivalent to 5603 SCF/bbl (standard cubic feet/barrel). More typically, the amount of hydrogen relative to the amount of hydrocarbon feedstock is in the range of from 9 to 178 $m^3/m^3$ (50 to 1000 SCF/bbl). The preferred range for the hydrogen-to-hydrocarbon feedstock ratio is from 18 to 36 $m^3/m^3$ (100 to 200 SCF/bbl).

The following examples are presented to further illustrate the invention, but they are not to be construed as limiting the scope of the invention.

Example 1

This Example 1 describes the preparation of Catalyst A in accordance with the invention and the properties and characteristics of such catalyst. Catalyst A was prepared by first forming a shaped mixture which was calcined at a first calcination temperature to form a calcined shaped particle. The calcined shaped particle was subsequently impregnated with an impregnation solution containing additional catalytic metals forming an overlayer on the calcined shaped particle. The impregnated calcined shaped particle was then recalcined at a second calcination temperature to form a calcined catalyst particle, which is the selective hyrodesulfurization catalyst composition of the invention.

Preparation of Calcined Shaped Particle

Several mixtures were prepared by mixing an alumina powder with fines from various crushed commercial hydroprocessing catalysts which contained molybdenum, nickel and phosphorus. The mixtures were mulled with a 1% aqueous solution of nitric acid for 35 minutes, extruded into 1.3 mm trilobe cylinders, dried at 100° C. (212° F.) for 3 hours to produce shaped particles which were calcined at 677° C. (1250° F.) for 2 hours. The resulting calcined shaped particles had from 4-5 wt % molybdenum, 0.7-1.0 wt % nickel and 0.5 to 1.0 wt % phosphorus. The pore size distribution of a representative calcined shaped particle, as determined by Hg intrusion under pressure, is shown in Table 1 below.

TABLE 1

| Pore Volume Distribution: | |
| --- | --- |
| Total Pore Volume, cc/g | 0.97 |
| % Pore Volume in Pores Having Diameters: | |
| Less than 70 Å | 4.4 |
| 70-100 Å | 24.7 |
| 100-130 Å | 22.4 |
| 130-150 Å | 4.7 |
| 150-180 Å | 3.2 |
| 180-200 Å | 1.3 |
| 200-240 Å | 1.6 |
| 240-300 Å | 1.4 |
| 300-350 Å | 0.7 |
| 350-450 Å | 1.0 |
| 450-600 Å | 0.8 |
| 600-1000 Å | 1.4 |
| Greater than 1000 | 32.0 |

Impregnation of the Calcined Shaped Particle

A calcined shaped particle prepared as described above was impregnated with an aqueous basic impregnating solution containing approximately 16 w % molybdenum (added as ammonium heptamolybdate) and 4.3 w % cobalt (added as cobalt carbonate). The base employed in the impregnating solution was ammonium hydroxide. The impregnated calcined shaped particle was allowed to age for two hours, dried at 125° C. overnight, and subjected to a further calcination at 900° F. (482° C.). The metals concentration, surface area and pore size distribution of the final calcined catalyst composition are shown in Table 2, below.

TABLE 2

| Metals Concentration | |
| --- | --- |
| Mo, wt % | 19.5 |
| Co, wt % | 4.2 |
| Ni, wt % | 0.8 |
| P, wt % | 0.9 |
| Surface Area | 168 m²/g |
| Pore Volume Distribution: | |
| Total Pore Volume, cc/g | 0.644 |
| Median Pore Diameter, Å | 124.8 |
| % Pore Volume in Pores Having Diameters: | |
| 70-100 Å | 11.64 |
| 100-130 Å | 28.09 |
| 130-150 Å | 11.17 |
| 150-200 Å | 8.23 |
| 200-240 Å | 2.17 |
| 240-300 Å | 1.17 |
| 300-350 Å | 0.78 |

TABLE 2-continued

| | |
| --- | --- |
| 350-450 Å | 1.40 |
| 450-600 Å | 0.93 |
| 600-1000 Å | 1.40 |
| Greater than 1000 Å | 31.66 |
| Greater than 5000 Å | 19.71 |

Comparative Catalyst B

Catalyst B is a commercial hydrodesulfurization catalyst generally used for finishing or polishing reactor applications comprising 3.4 wt % cobalt and 13.6 wt % molybdenum on an alumina support and further having a surface area of 235 m²/g. Catalyst B has 98% of its total pore volume in pores having a diameter less than 250 Å, and no measurable percentage of pores having a pore diameter of 1000 Å or greater.

Example 2

This Example 2 describes the experimental procedure used to measure the performance of Catalyst A, in accordance with the invention, and Comparative Catalyst B, in the selective hydrodesulfurization of an olefin-containing hydrocarbon feedstock (a catalytically cracked gasoline) having a concentration of sulfur.

A laboratory stainless steel isothermal tube reactor, having a nominal diameter of ¾ inch, was packed with a volume of the relevant catalyst (either Catalyst A or Catalyst B). The catalyst was supported by a layer 20 mesh silicon carbide and on top of the catalyst bed was placed a layer of 20 mesh silicon carbide. The catalyst was mixed in a 4:1 ratio of silicon carbide diluent to catalyst, and filled into the reactor in six equal aliquots, making sure that the catalyst was uniformly distributed across the reactor bed. The catalyst was sulfided prior to passing the feed over it at hydrotreatment conditions. A catalytically cracked gasoline feed, having a bromine number of 24, a total sulfur content of 159 ppm, an initial boiling point and a final boiling point respectively of 56.1° C. (133° F.) and 247.8° C. (478° F.), was passed over the catalyst at isothermal operating temperatures ranging from 246.1° C. (475° F.) to 315.6° C. (600° F.), a liquid hourly space velocity (for hydrocarbon feed) of 10 hr$^{-1}$, a gaseous hourly space velocity (for hydrogen gas rate) of 200 SCF/bbl, and a pressure of 280 psig for each of the reactor runs.

Presented in Table 3 is a summary of the results from the reactor runs described above showing the amount of sulfur removal relative to the amount olefin saturation (as indicated by bromine number reduction) for each of the reactor runs.

TABLE 3

| Selective Desulfurization Test Results | | | | |
| --- | --- | --- | --- | --- |
| Catalyst | Sulfur, ppm | Sulfur Reduction, % | Bromine Number | Bromine Number Reduction, % |
| Catalyst A | 18 | 88.7 | 18.3 | 23.8 |
| (in accordance | 14 | 91.2 | 17.3 | 27.9 |
| with the invention) | 21 | 86.8 | 15.0 | 37.5 |
| Catalyst B | | | | |
| (Comparative) | 20 | 87.4 | 13.0 | 45.8 |

The above presented data show that Catalyst A in accordance with the invention, which has a unique bimodal pore structure and has molybdenum and nickel underbedded in an inorganic refractory oxide substrate overlaid with molybdenum and cobalt, provides for a higher amount of sulfur removal with a lower amount of olefin reduction (as reflected by the lower bromine number reduction) relative to commercial Catalyst B.

It is understood that while particular embodiments of the invention have been described herein, reasonable variations, modifications and adaptations thereof may be made that are within the scope of the described disclosure and the appended claims without departing from the scope of the invention as defined by the claims.

The invention claimed is:

1. A process for selectively hydrodesulfurizing sulfur compounds contained in an olefin-containing hydrocarbon feedstock with minimal hydrogenation of olefins, which process comprises:

contacting in a reactor under selective hydrodesulfurization conditions said olefin-containing hydrocarbon feedstock with a calcined catalyst particle made by calcining a shaped particle of a mixture comprising an inorganic oxide support material, molybdenum trioxide and a nickel compound to provide a calcined shaped particle;

wherein said calcined shaped particle is further overlaid with a cobalt compound and a molybdenum compound and is subjected to a further calcination step to produce said calcined catalyst particle, said calcined catalyst particle being characterized by having a bimodal pore size distribution with at least 20% of the total pore volume being in pores having a diameter less than 250 angstroms and at least 10% of the total pore volume being in pores having a diameter greater than 1000 angstroms.

2. The process as recited in claim 1, wherein said catalyst has a molybdenum content of from 9 wt % to 23 wt %, a cobalt content of from 2 wt % to 8 wt %, a nickel content of from 0.5 wt % to 2 wt %, and a phosphorus content of from 0.1 wt % to 3.5 wt %, each of said percentages calculated as the element.

3. The process as recited in claim 2, wherein said olefin containing feedstock is a cracked gasoline or cracked naphtha feedstock.

4. The process as recited in claim 3, wherein the reactor is a polishing reactor.

5. The process as recited in claim 4, wherein the sulfur content of the cracked gasoline feedstock is reduced to below 15 ppmw.

6. The process as recited in claim 5, wherein said calcined catalyst particle has at least 40% of the total pore volume in pores having a diameter less than 250 angstroms and at least 20% of the total pore volume in pores having a diameter greater than 1000 angstroms.

7. The process as recited in claim 1, wherein said calcined catalyst particle has at least 30% of the total pore volume in pores having a diameter less than 250 angstroms and at least 15% of the total pore volume in pores having a diameter greater than 1000 angstroms.

8. The process as recited in claim 1, wherein said calcined shaped particle is overlaid with a substantial absence of impregnated nickel.

9. The process as recited in claim 1, wherein said calcined catalyst particle has at least 5% of the total pore volume in pores having a diameter greater than 5000 angstroms.

* * * * *